N. SCHOLFIELD.
Bomb Lance.
No. 478.
Reissued July 7, 1857.
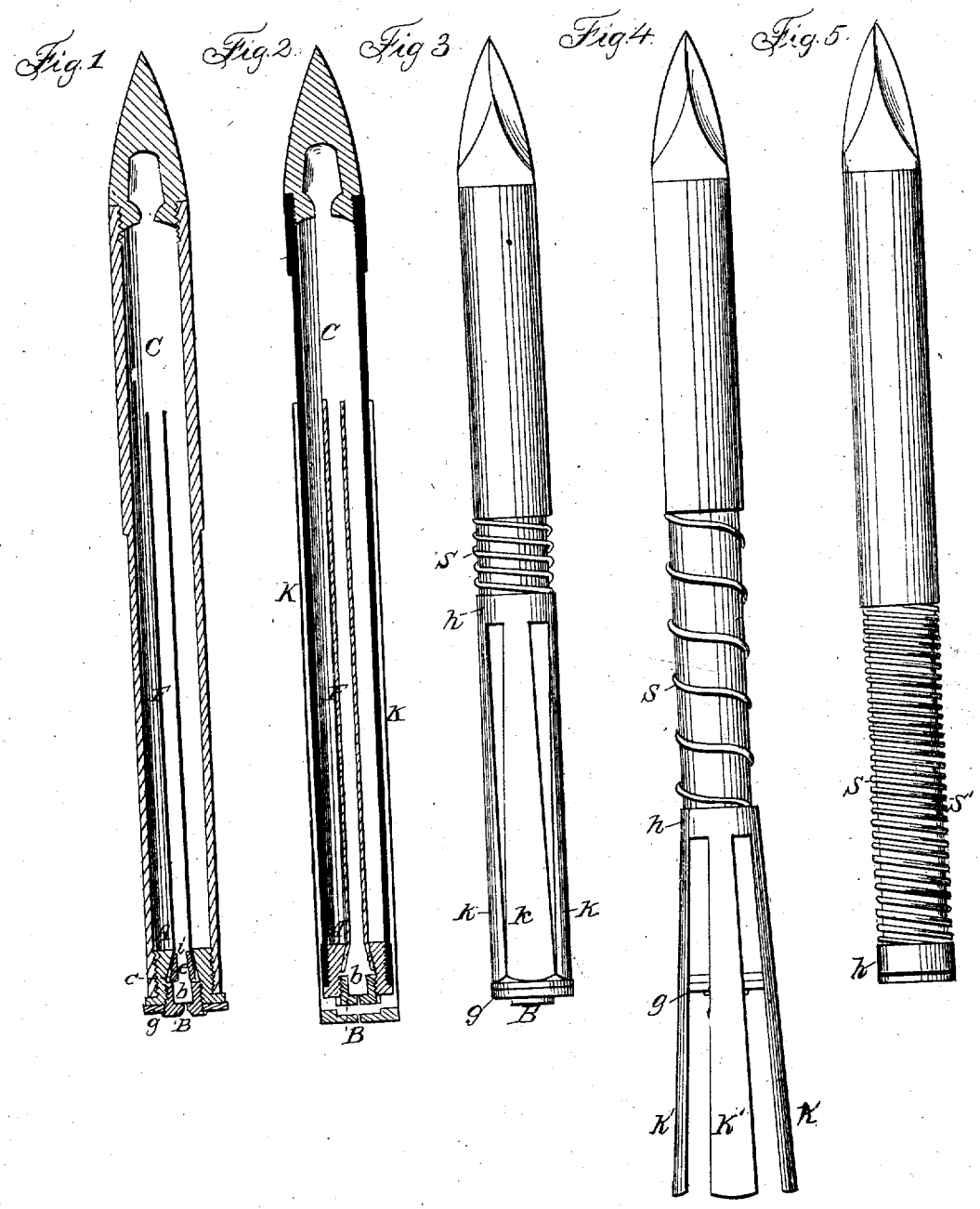

UNITED STATES PATENT OFFICE.

NATHAN SCHOLFIELD AND WM. W. WIGHT, OF NORWICH, CONNECTICUT, ASSIGNORS TO NATHAN SCHOLFIELD.

IMPROVED BOMB FOR KILLING WHALES.

Specification forming part of Letters Patent No. 16,819, dated March 10, 1857; Reissue No. 478, dated July 7, 1857.

*To all whom it may concern:*

Be it known that we, NATHAN SCHOLFIELD and WILLIAM W. WIGHT, of Norwich, New London county, and State of Connecticut, have invented a new and useful Improvement in Whale-Bombs and other Projectiles; and we do hereby declare that the following is a full and exact description thereof, reference being had to the accompanyings drawings, making part of this specification.

The nature of our invention consists in a peculiar construction and application of expanding and extension wings to guide and govern the direction of projectiles, and a peculiar mode of constructing and applying a fuse-pipe and fuse to a bomb for killing whales.

Figures 1 and 2 are sectional views of a whale bomb-lance exhibiting improved modes of attaching the fuse-pipe and fuse, and sectional views of extension-guides on the surface. Figs. 3, 4, and 5 represent surface views of a bomb with the extension and expansion guides.

The medium size of this bomb is about one and one-eighth inch in diameter and sixteen inches in length, with a triangular point for piercing the whale, and having a cavity, C, within for containing powder.

F is a fuse-pipe fastened firmly to the breech-nut A, and extending into the cavity of the bomb about eight inches, or a sufficient distance to allow a suitable time to elapse after the discharge of the bomb from the gun before its explosion. For the purpose of fastening the fuse-pipe, which consists of a small copper or brass pipe about one-fourth of an inch in diameter, the hole through the nut A, in which it is inserted, is made a little conical or tapering, being largest at the rear end, *c*, and is of just sufficient size at the smallest part to receive the end of the fuse-pipe tightly, and after the pipe is inserted and forced in about three-eighths of an inch, or about two-thirds the thickness of the nut, the end of the pipe should be swaged by driving within a conical tool, which enlarges the pipe at the end, within the tapering cavity of the nut, so that it is firmly fastened and cannot be withdrawn. A short piece, *e*, of small pipe of some malleable metal, through which the fuse is inserted, is beveled or tapered a little at one end, and the fuse-cord is passed through the pipe F, and while its end is still remaining in the short tapered or conical piece of pipe *c* this is driven or forced into the former pipe, which tends more strongly to secure that pipe by spreading and enlarging it, and is itself also contracted, especially at its beveled edge *i*, where it is forced within the pipe F, and holds the fuse tightly, so that the force of the explosion in the discharge of the gun will not force it out, and thereby cause an explosion of the bomb before or while in the act of a discharge from the gun.

Gypsum or plaster-of-paris may be used for securing the fuse at the ends of the pipe instead of the short holding-pipe *e*, for which purpose it should be applied in a plastic state, and should be well set in around the fuse within the pipe at both ends.

The fuse-pipe may, if preferred, be made of tin, and should be soldered to the breech-nut where it enters; or, instead of the short conical pipe *e* to compress and hold the fuse securely within the end of the fuse-pipe F, the fuse-pipe may be passed completely through the conical cavity of the breech-nut, as shown at Fig. 2, and after being enlarged, as before described, the fuse-cord, having its rear end enlarged by winding it tightly with twine covered or saturated with wax or some other adhesive substance, may be inserted and passed through, drawing it in tightly, so that the enlarged part of the fuse-cord shall be tightly set in the conical enlargement of the rear end of the fuse-cord, after which, if the end of the fuse-cord extends to the rear beyond the end of the fuse-pipe, molten brimstone, wax, or any suitable plastic and adhesive substance may be poured around it to secure it more effectually from the pressure of the explosive action of the charge in the gun. The pipe should also be contracted at the opposite end after the fuse is inserted, to prevent its being forced through by its own explosive action before complete combustion.

The nut A has a cavity, in which another nut, B, is screwed. This nut B has a small perforation through it and a larger cavity, *b*, in connection with the end of the fuse. This cavity serves as an air-chamber, to allow of the combustion of the fuse in the first instant, when ignited by the charge in the gun, which acts through the small passage in the nut, after which the gas liberated by the combustion of the fuse, freeing itself through this passage, prevents the ingress of water to quench the fuse, even though the bomb should be submerged.

The flange of the nut A, Fig. 1, should be of a diameter accurately to fit the bore of the gun, but to pass freely therein, while a slight windage should be allowed on the cylindric part of the bomb, and immediately following the flange of the nut A should be a ring or collar, *g*, of leather or some equivalent material, of just sufficient size to crowd into the bore. This collar *g* is held by the flange on the nut B.

Figs. 3 and 4 represent the whale-bomb fitted with the expanding extension-wings to guide and govern the direction, the construction and action of which is as follows, viz: The rear end of the bomb is turned a little smaller than the full or proper size of the main bomb, so as to receive the sliding collar *h*, to move freely thereon longitudinally, and still suffering the said collar to be slightly smaller in diameter than the anterior portion of the bomb, or than the bore of the gun from which it is to be discharged. On this collar are attached metallic wings or guides *k*, composed of thin plates of metal possessing a degree of elasticity sufficient to restore them to any given position to which they are adapted when left free after being forced from such position.

*k′ k′ k′*, Fig. 3, are the positions of the guiding-wings, consisting of sheets in form of cylindric segments corresponding to the surface of the bomb. These are so attached to the ring, or are so bent or curved near their connections, as naturally to be in an expanded form, or stand out from the surface of the bomb, and are here represented as being held down, as if in the bore of the gun; but by its removal therefrom the wings would expand, so that their rear ends would stand at a distance from the cylinder, and the spiral spring S, while in such position, would force the collar with the guides *k* to the rear, and in positions as at Fig. 4, the action of the spring having been prevented from effecting this extension while the guides were lying on the surface by the flange of the breech-nut A, which, as observed above, should accurately fit the bore of the gun. Two spiral springs, or a two-fold spiral, may be used instead of one, if preferred.

The guides or wings *k* may be made in one piece with the collar *h* from a thin metallic pipe of suitable dimensions by slitting it from one end to within a short distance of the other, and bending them so as to insure a natural inclination outward, or they may be in a similar manner formed from a single sheet of metal whose width is equal to the circumference of the bomb by slitting it from one end toward the other, but leaving sufficient length unslit to form the width of a belt or ring, *h*, which may be formed in shape by soldering or otherwise.

Much care should be observed that the guiding-wings should be similar not only in size but in their assumed positions relative to the axis of the bomb when in motion, since they serve, like the rudder of a ship, to guide its motion; and if one is in position to press harder on the air than others in its flight, it will prevail to alter its course. Therefore sheets of nearly equal elasticity, and those whose elasticity is not injured by pressing them hard down on the surface of the bomb after being fitted with the proper expansion, should be used. But whatever injurious effects would result from the unequal action of the wings when fitted with ordinary care may be effectually overcome by giving these wings a slight curve or a slight diagonal position in relation to the axis of the bomb or other projectile, so as to generate a motion of rotation on its axis which would compensate the sources of error or deviation from the true course and cause it to pursue the proper line of direction. The spring S may be dispensed with, if preferred, for the resistance of the air to the motion will cause the wings to move backward or toward the rear end of the projectile when they are raised from the surface of the cylinder; but a slight spring will insure a little more certainty of action. There may be any number of the guiding-wings *k*; but the whole number, when folded about the cylindric surface of the projectile, should not more than cover that surface. Three should be the smallest number, and the three together might at their rear ends just span the projectile when folded thereon; but, on account of their cylindric form, to insure proper flexibility they would require to be narrowed as we approach their anterior extremity, or as we approach the collar by which they are held; but if six wings are allowed they would usually be so narrow that no necessity would exist for narrowing them further near their connection, as they would be sufficiently flexible without. These wings, instead of expanding, may, with the collar, be made simply to slide to the rear after leaving the gun; but in this case the flange of the breech-nut A should be made small enough to allow them to pass without obstruction, but should be large enough to prevent the collar *h* from passing off; and in this case the sheet of metal of which they are composed may be unslit, allowing it to possess the form of a sliding cylindric case, K, as shown in section at Fig. 2; but with this arrangement there should be a metallic disk of the exact size of the bore of the gun, to follow the projectile in firing, to prevent the wings or case from sliding back before leaving the gun. The rear ends of the wings or of the case may, if preferred, be soldered or otherwise fastened to this disk; but when used for a bomb it should have a small perforation in its center, to allow the flame from the firing of the gun to ignite the fuse.

The collar *h*, instead of carrying wings *k*, as at Figs. 3 and 4, may be used without these wings, as at Fig. 5, and in such case it may be allowed to pass off of the bomb-lance at the rear end, after leaving the gun, being connected to the end of the twofold helical spring S S′, which is also made fast at its forward end to the surface of the bomb, and this, by its resistance in its flight, will serve to guide the lance.

These bombs may be made of malleable cast-iron or of wrought-iron pipe. The latter is preferred; and in this case the piercing-point may be of common cast-iron screwed into the anterior extremity in the same manner as the breech-nut in the rear end, and the piece forming the point may, in such case, be cast hollow, so as to contain powder, and may be disrupted with the main body of the bomb by the explosion.

This mode of applying the guiding-wings is applicable to bombs and other projectiles for military purposes, as well as for shooting large game on sea and land.

We are aware that the fuse has been applied to bombs by being inserted in a pipe, and molten metal afterward poured in the end of the pipe around the fuse, to encompass and hold it tightly, and other modes of fastening the fuse have been adopted; but we do not claim the mode here referred to, or any other heretofore used; nor do we claim the application of metallic wings or feathers to govern the direction of a projectile; but

What we claim as our invention, and for which we solicit Letters Patent, is—

1. Inserting the end of the fuse through a short holding pipe or collar, *e*, and securing it firmly therein by compressing the same, and the driving or forcing this within the end of the fuse-pipe, having a conical enlargement at its rear end.

2. Enlarging the end of the fuse-cord by winding it with twine or its equivalent, so that it cannot be drawn through the pipe, and inserting it in the fuse-pipe either with or without the fastening-pipe *e*, and putting gypsum, brimstone, or wax around it within the nut A, to hold it securely.

3. The application of the sliding collar *h* on a projectile carrying a cylindric metallic plate covering the projectile, and either slit to form wings *k*, or unslit, as a cylindric case, and so constructed that the said collar, with the case or wings, shall slide to the rear after being discharged from the gun, either by the action of the spring or the resistance of the air to guide its direction.

4. So constructing and applying these wings *k* that they may coincide with the cylindric surface of the projectile while in the gun, and that their rear ends may be thrown up therefrom by their elasticity after being discharged, so as to stand in positions diverging from that surface in the rear.

5. The application of helical or spiral springs S on the surface of a projectile to force to the rear a collar, *h*, (either with or without the guides *k*,) after leaving the gun, substantially as described.

NATHAN SCHOLFIELD.
WILLIAM W. WIGHT.

Witnesses:
JOHN BARNES,
CHAS. H. HINCKLEY.